United States Patent [19]

Eddinger et al.

[11] 4,213,826
[45] Jul. 22, 1980

[54] FLUIDIZED COAL CARBONIZATION

[75] Inventors: Ralph T. Eddinger, Princeton Junction; Louis D. Friedman, New Brunswick, both of N.J.

[73] Assignee: Cogas Development Company, Princeton, N.J.

[21] Appl. No.: 947,369

[22] Filed: Oct. 2, 1978

[51] Int. Cl.² ............................................. C10B 49/10
[52] U.S. Cl. ..................................... 201/31; 48/210; 201/29; 201/36; 201/37; 208/8 R
[58] Field of Search ....................... 201/28, 31, 14, 16, 201/29, 36, 37; 208/8 R; 48/197 R, 210

[56] References Cited

U.S. PATENT DOCUMENTS

| | | | |
|---|---|---|---|
| 2,773,018 | 12/1956 | Parry | 201/31 |
| 2,955,077 | 10/1960 | Welinsky | 201/31 X |
| 2,955,988 | 10/1960 | Sebastian | 201/29 |
| 3,043,752 | 7/1962 | Foch | 201/31 |
| 3,375,175 | 3/1968 | Eddinger et al. | 201/44 X |
| 3,573,194 | 3/1971 | Hopper et al. | 201/29 X |
| 3,836,435 | 9/1974 | Skornyakov et al. | 208/8 R X |
| 4,056,443 | 11/1977 | Colletta et al. | 201/31 X |

FOREIGN PATENT DOCUMENTS 1006043 9/1965 United Kingdom ...................... 201/31

Primary Examiner—Joseph Scovronek
Assistant Examiner—Roger F. Phillips
Attorney, Agent, or Firm—Robert D. Jackson

[57] ABSTRACT

In the multi-stage fluidized carbonization of coal to produce, oil, gas and char, oil containing vapors from the first stage are used as the fluidizing gas to dry the incoming coal feed. The oil vapor pressure of the fluidizing gas is maintained at a value under 10 mm. to prevent oil condensation in the fluidized drying vessel. The technique makes possible the recovery of sensible heat from the first stage overheads.

3 Claims, 1 Drawing Figure

TYPICAL FLOW SHEET
HIGH VOLATILE B BITUMINOUS COAL

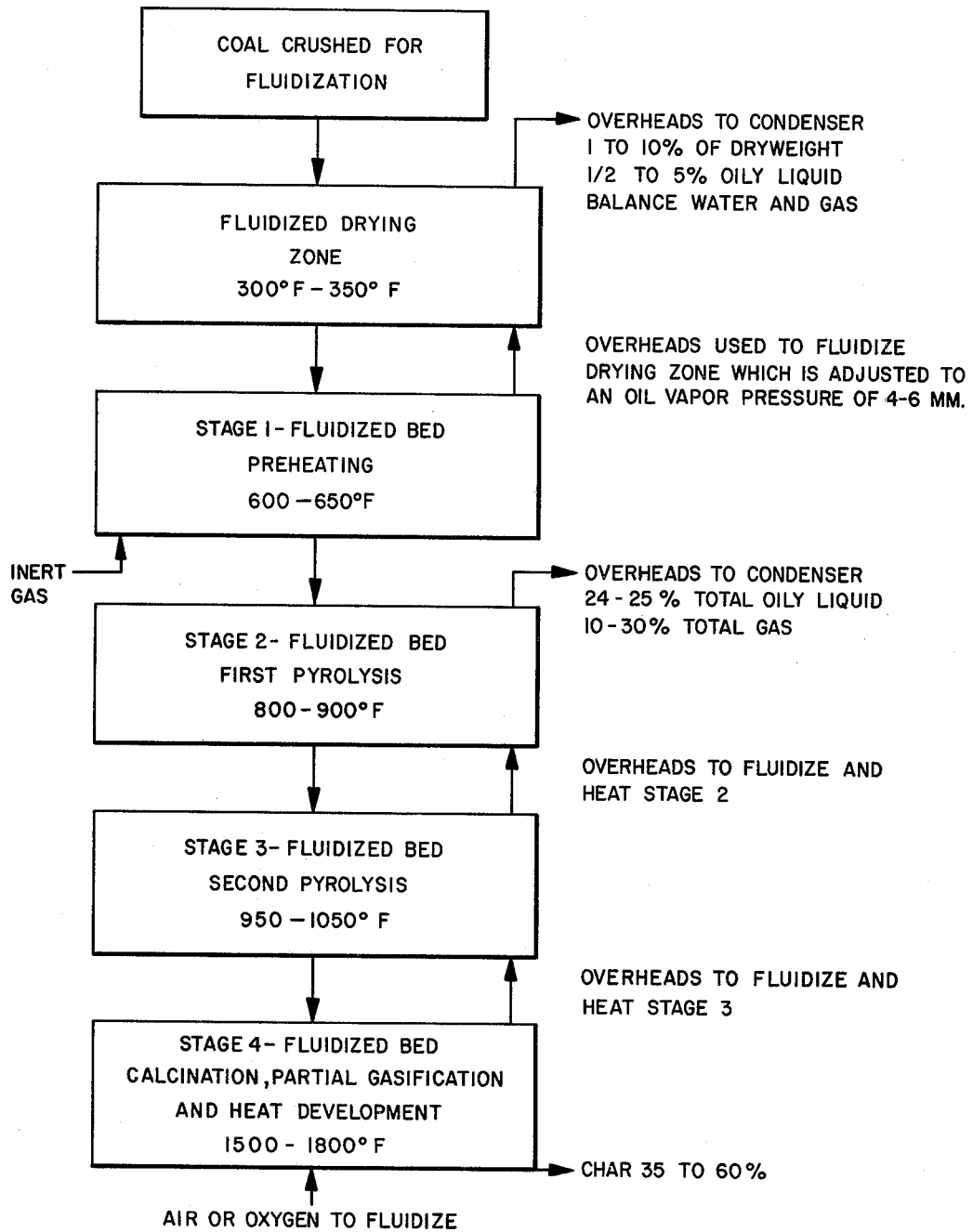

FLUIDIZED COAL CARBONIZATION

This invention relates to the fluidized carbonization of coal and is particularly concerned with improvements in fluidizing efficiency.

The carbonization of coal in fluidized beds to produce char and hydrocarbonaceous products is well known, being extensively documented in the patent and technical literature. An improved version of this technology is described in U.S. Pat. No. 3,375,175 to Eddinger, et al. In the Eddinger, et al. approach, finely divided coal is passed through a series of fluidized beds at successively higher temperatures up to about 1000° F. to produce a mixture of gas, oil, tar and char. Such multistage carbonization avoids agglomeration while the use of off gases from downstream vessels to fluidize upstream vessels, enhances thermal efficiency. The fluidizing atmosphere is essentially oxygen free which assures maximum yield of tar. Heat for the process is provided by combustion of a portion of the char.

Because of its high thermal efficiency, good product yield and relatively trouble-free design, the Eddinger, et al carbonization process has been integrated in a total coal conversion system in which the highly reactive char serves as the carbonaceous feed material for reacting with steam in a fluidized bed to make synthesis gas. The latter is then methanated to form methane or substitute material gas (SNG) while the tar is hydrotreated to give high quality liquid fuels. For a more detailed description of the process, reference is made to U.S. Pat. No. 3,966,633 to Friedman.

Although generally satisfactory in overall performance, the Eddinger, et al fluidized coal carbonization is susceptible to further improvement with respect to the manner in which the first stage is operated. As explained in the aforecited Eddinger, et al patent, stage 1 is a fluidized drying and pretreatment zone which serves to prepare and condition the coal for the subsequent carbonization stages. In carrying out stage 1, coal crushed to a size suitable for fluidization, is fed into a first fluidized bed where it is maintained at a temperature sufficiently below its fusion temperature to prevent agglomeration but sufficiently high to drive out substantial quantities of oily volatiles in addition to unbound water. With high volatile bituminous C coals and higher rank coals, the temperature range is from about 600° F. to about 650° F. while low volatile bituminous coal can be heated at temperatures up to about 850° F. without fear of agglomeration. Fluidization is by means of an inert gas, preferably hot flue gas which both heats and fluidizes, although external heating may be used. About 1% to 10% of the weight of the dry coal is removed overhead as volatile matter over a residence time of from about 1 to 30 minutes; of this overhead, up to about half represents material condensable to oily hydrocarbon liquids.

Now the drawback in carrying out the Eddinger, et al process is the loss of sensible heat from stage 1 overheads. This situation arises because stage 1 must be heated by means of a separate source of fluidizing gas whereas the other stages can be fluidized by the overheads from subsequent stages so that there is utilization of sensible heat in the said overheads as they pass from the hot downstream vessels through the cooler upstream vessels and eventually exit from the first carbonizer vessel. However, any attempt to channel the downstream overheads into stage 1 results in almost immediate loss of fluidization and plugging of connecting lines due to condensation of heavy tar vapors in the relatively cool environment of the stage 1 vessel.

From the foregoing, it can be seen that the fluidized coal carbonization process aforesaid is amenable to further improvement.

In accordance with the present invention which is directed to the multistage fluidized carbonization of coal to produce oil, gas and char wherein the coal is:

1. Heated in a first stage below its fusion temperature under oxygen free conditions in a first fluidized bed formed by passing an inert gasiform stream upwardly through the stage to maintain the coal in the fluidized state and remove 1 to 10% volatiles;

2. In at least a second stage passing the sotreated coal into at least one other fluidized bed which is fluidized by the gaseous overheads from the subsequent stages at a temperature above that of the first bed and below the fusion point of the solids fed to that stage, under oxygen-free conditions, for a time sufficient to remove nearly all of the volatiles from the coal condensable oily liquids, and 3. In a final stage passing the thus-treated coal into a final fluidized bed which is fluidized by an oxygen-containing gas at a still higher temperature, to substantially devolatilize the coal, an improvement is obtained of recovering sensible heat from the overheads of stage 1 comprising the steps (1) providing a fluidized drying zone to receive the particulate coal feed; (2) using the stage 1 overheads as the fluidizing atmosphere in step (1) to heat and dry the particulate coal feed while maintaining the vapor pressure of the oil in the drying zone at a value of under 10 mm; (3) conveying the dried coal to stage 1; and (4) recovering oil from the overheads of the fluidized drying zone.

In carrying out the invention, the process of the Eddinger, et al patent is generally followed but modified to incorporate the herein improvement of recovering sensible heat from the overheads of stage 1. Accordingly, finely divided coal feed is introduced into a fluidized drying vessel in which the fluidizing atmosphere is provided by the stage 1 overheads while maintaining the vapor pressure of the oil in the drying vessel below 10 mm. pressure; preferably in the range of about 4 to 6 mm. Techniques for achieving this condition include (1) providing a controlled quantity of fluidizing gas in the first stage of pyrolysis which is usually conducted at a temperature of about 600°–650° F.; (2) by the addition of an inert gas to the overheads prior to conveying them to the fluidized drying vessel and (3) operating the first pyrolysis stage at a selected temperature to more precisely control the amount of oil evolved with the overheads.

The temperature of the first pyrolysis stage overheads from the time they exit until they enter the fluidized drying vessel are maintained in a range defined as not more than about 50° F. to about 100° F. below their exiting temperature of about 600° to 650° F. This can be readily implemented by cladding the gas lines with heavy insulation. Generally speaking, the fluidized drying vessel is operated at about 300° to 350° F. so the temperature of the stage 1 overheads should be high enough to provide this temperature range.

Reference is now made to the drawing which shows the process of the invention flow sheet operated with a high volatile B bituminous coal. The coal is first crushed to a size desirable for fluidization, generally minus 10 mesh, and is fed into a fluidized drying zone where it is maintained at a temperature sufficiently high to substantially drive off all unbound water; temperatures are generally in the range of 300° to 350° F. The fluidizing atmosphere for drying the coal is provided by the stage 1 overheads. The oil vapor pressure in the drier is held at 4 to 6 mm. The temperature of the stage 1 overheads as they enter the fluidized drying zone are not less than 50° to 100° F. of the bed temperature of stage 1. Overheads from the fluidized dryer are conveyed to a condenser where the oils are recovered and these combined with the overheads from stage 2 for total oil yield. Gases in the overheads may contain pollutants such as sulfur dioxide which can be removed by scrubbers and the clean gas vented to atmosphere. The dried coal is then conveyed to stage 1 for heating and further treatment in accordance with the aforecited Eddinger, et al patent.

the invention is further illustrated by the following non-limiting examples.

PROCEDURE FOR CARRYING OUT THE EXAMPLES

Two thousand three hundred seventeen (2,317) grams of crushed, undried 100×200 mesh Illinois No. 5 seam coal were charged to a 350° F. fluidized drying bed during a 3¼ hour period. At the same time the dried coal from this bed was allowed to drop through a downcomer into a lower 650° F. bed fluidized with hot nitrogen flowing at a velocity of 0.1 feet per second. The vessel for the fluidized beds was a 1.5 inch internal diameter (I.D.) stainless steel pipe. The nongaseous product recovery was:
  Oil 34 grams
  Solids 2,180 grams
  Total 2,214 grams The bulk of the lost material was moisture carried out of the bed by the fluidizing gas. Less than 1 weight percent of gas was recovered. The calculated vapor pressure of the oil in the upper drying zone for all the examples varied between 4.2 and 6.3 mm. After the treatment was completed, the reactor was found to be clean and neither bed had any coke or solids build-up and both downcomers were free of obstructions.

Five separate coal specimens were subjected to the treatment aforesaid and the results are itemized in Table I. As can be seen from the data in the table, oil yields ranging from 0.5 weight percent to 1.5 weight percent were obtained while residence times in each bed were varied from 15 to 40 minutes.

The examples clearly demonstrate the practicality of using oil containing vapors from low temperature coal pyrolysis as a fluidizing atmosphere in drying the coal feed stocks in a fluidizing carbonization system provided that the vapor pressure in the oil containing vapors is maintained below about 10 mm. in accordance with the invention.

TABLE 1

| | Two-Stage Pyrolysis of Coals | | | | |
|---|---|---|---|---|---|
| Example No. | 1 | 2 | 3 | 4 | 5 |
| Coal Origin and Rank | High Volatile Bituminous C Southwestern Coal Co. Illinois | High Volatile Bituminous C Southwestern Coal Co. Illinois | High Volatile Bituminous C Southwestern Coal Co. Illinois | High Volatile Bituminous A CNG Co., Pa. | High Volatile Bituminous A M&O Coal, W. Va. |
| Coal Seam | Mixed Illinois 5 & 6 | Illinois No. 5 | Illinois No. 5 | Pittsburgh | Pittsburgh |
| Free Swelling Index* | 5 | 5.5 | 5.5 | 6.5 | 6–7 |
| Fluidizing Gas | Nitrogen | Nitrogen | Nitrogen | Nitrogen | Nitrogen |
| Tyler Mesh | 100 × 200 | 200 × 235 | 100 × 200 | 48 × 200 | 48 × 200 |
| Temperature, °F. | | | | | |
| Drying Stage | 350 | 340–350 | 350 | 350 | 300–350 |
| Drying Stage Grid Bottom | 610–660 | 630–665 | 620–650 | 635–650 | 630–640 |
| First Pyrolysis Stage | 625–680 | 630–660 | 630–645 | 620–630 | 620–635 |
| Oil Yield wt. % | 1.5 | 1.5 | 2.0 | 0.5 | 0.5 |

*This is a measure of the coking tendency of coals. The scale runs from 0 to 9. Higher values indicate higher coking tendencies.

We claim:

1. In the multistage fluidized carbonization of coal to produce oil, gas and char wherein the coal is:
    1. Heated in a first stage below its fusion temperature under oxygen free conditions in a first fluidized bed formed by passing an inert gasiform stream upwardly through the stage to maintain the coal in the fluidized state;
    2. In at least a second stage passing the so-treated coal into at least one other fluidized bed which is fluidized by the gaseous overheads from the subsequent stages at a temperature above that of the first bed and below the fusion point of the solids fed to that stage, under oxygen-free conditions, for a time sufficient to remove nearly all of the volatiles from the coal condensable oily liquids, and
    3. In a final stage passing the thus-treated coal into a final fluidized bed which is fluidized by an oxygen-containing gas at a still higher temperature, to substantially devolatilize the coal, the improvement of recovering sensible heat from the overheads of stage 1 comprising the steps (1) providing a fluidized drying zone to receive the particulate coal feed; (2) using the stage 1 overheads as the fluidizing atmosphere in step (1) to heat and dry the particulate coal feed while maintaining the vapor pressure of the oil in the drying zone at a value of under 10 mm; (3) conveying the dried coal to stage 1; and (4) recovering oil from the overheads of the fluidized drying zone.

2. The method according to claim 1 wherein the oil vapor pressure of the oil is 4 to 6 mm.

3. The process according to claim 1 wherein the coal is dried at a temperature of about 300° F. to about 350° F.

* * * * *

UNITED STATES PATENT AND TRADEMARK OFFICE
CERTIFICATE OF CORRECTION

PATENT NO. : 4,213,826
DATED : July 22, 1980
INVENTOR(S) : R.T. Eddinger and L.D. Friedman It is certified that error appears in the above-identified patent and that said Letters Patent are hereby corrected as shown below:

Column 1, line 29, "material" should read --natural--.
Column 4, Table 1, under Example 2, heading of Tyler Mesh, "200 x 235" should read --200 x 325--.

Signed and Sealed this

Fourth Day of November 1980

[SEAL]

Attest:

SIDNEY A. DIAMOND

Attesting Officer

Commissioner of Patents and Trademarks